United States Patent
Nakaminami et al.

(10) Patent No.: US 6,892,613 B2
(45) Date of Patent: *May 17, 2005

(54) MACHINE TOOL

(75) Inventors: Masamitsu Nakaminami, Yamatokoriyama (JP); Jun Adachi, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/849,437

(22) Filed: May 7, 2001

(65) Prior Publication Data

US 2002/0011137 A1 Jan. 31, 2002

(30) Foreign Application Priority Data

May 8, 2000 (JP) ........................................ 2000-134431

(51) Int. Cl.[7] ............................................... B23B 5/00
(52) U.S. Cl. ........................................... 82/901; 82/142
(58) Field of Search .......................... 82/901, 121, 129, 82/124, 149, 142; 409/137; 29/DIG. 56, DIG. 60, DIG. 79, DIG. 94; 451/397, 398, 143, 242, 246

(56) References Cited

U.S. PATENT DOCUMENTS

| | | | | |
|---|---|---|---|---|
| 4,327,612 A | * | 5/1982 | Bazuin | 82/120 |
| 4,457,193 A | * | 7/1984 | Matthey | 29/36 |
| 4,515,191 A | * | 5/1985 | Fetty | 144/35.1 |
| 4,545,271 A | * | 10/1985 | Romi | 82/149 |
| 4,597,144 A | * | 7/1986 | Frank et al. | 483/37 |
| 4,665,784 A | * | 5/1987 | Niedbala et al. | 82/122 |
| 4,742,609 A | * | 5/1988 | Neumann | 483/3 |
| 5,214,829 A | * | 6/1993 | Minagawa | 29/27 C |
| 5,293,793 A | | 3/1994 | Hessbr+e,uml +ee uggen et al. | |
| 5,655,423 A | | 8/1997 | Nishio et al. | |
| 5,667,432 A | * | 9/1997 | Rollier | 451/242 |
| 5,669,751 A | * | 9/1997 | Hoffman et al. | 414/751.1 |
| 5,715,068 A | * | 2/1998 | Izor et al. | 358/3.29 |
| 6,021,695 A | * | 2/2000 | Kosho et al. | 29/35.5 |
| 6,073,323 A | * | 6/2000 | Matsumoto | 29/27 C |

FOREIGN PATENT DOCUMENTS

| | | |
|---|---|---|
| DE | 44 41 106 A | 5/1996 |
| EP | 0 319 731 A | 6/1989 |
| GB | 2 215 251 A | 9/1989 |
| JP | 63-162101 A | 7/1988 |

* cited by examiner

*Primary Examiner*—Bena B. Miller
(74) *Attorney, Agent, or Firm*—Smith Patent Office

(57) ABSTRACT

A machine tool that comprises a fixed bed, a pair of tool posts mounted on the fixed bed on a side closer to an operator and a carriage mounted on each of the tool posts is disclosed. A headstock is provided on a side of the fixed bed farther from the operator so that a workpiece disposed in the headstock is subjected to a cutting process by moving the carriages and the tool posts relative to the workpiece. The machine tool also includes a headstock base having the headstock disposed thereon. The headstock base is structured and arranged so as to be movable between a workpiece machining position where the workpiece can be machined at a position farther from the operator and a workpiece loading and unloading position where the workpiece can be loaded and unloaded at a position closer to the operator.

8 Claims, 2 Drawing Sheets

MACHINE TOOL

BACKGROUND OF THE INVENTION

1. Field of the Invention

The present invention relates to a machine tool having a carriage disposed on a fixed bed on a front side closer to an operator while a headstock is provided on a rear side farther from the operator.

2. Discussion of the Related Art

There has conventionally been mass production type machine tools such as a Numerically Controlled lathe (also called a NC lathe) where carriages, each with a tool post mounted thereon, are provided on the left and right sides of a front side of the fixed bed that is closer to the operator. The tool posts and the carriages are movable in the X-axis and Z-axis directions, respectively. A headstock is fixedly disposed on the rear side (side farther from the operator) between the two tool posts.

In these types of machine tools, a workpiece is loaded onto the spindle of the headstock. Then, while the workpiece is being rotated, the left and right carriages and tool posts are moved relative to each other, so as to subject the workpiece to a specified cutting process.

In a conventional machine tool, because its structure of the headstock is fixedly disposed rearwardly of the left and right carriages, loading and unloading the workpiece on the spindle with another workpiece must be done at a significant depth of the fixed bed, thereby causing some difficulty for the operator and a lower operational efficiency.

Also, in some conventional machine tools, chips resulting from the machining processes are discharged toward the operator. In such machine tools, these chips tend to be an obstacle to loading and unloading the workpiece and this also reduces operational efficiency and convenience.

SUMMARY OF THE INVENTION

The present invention has been made to overcome these problems.

An object of the present invention is to provide a machine tool which allows loading and unloading work to be easily achieved and thereby improves operational efficiency.

In order to achieve the above and other objects according to a first aspect of the invention, a machine tool is provided that comprises a fixed bed, a pair of tool posts mounted on the fixed bed on a side closer to an operator and a carriage mounted on each of the tool posts. A headstock is also provided on a side of the fixed bed farther from the operator so that a workpiece disposed in the headstock is subjected to a cutting process by moving the carriages and the tool posts relative to the workpiece. The machine tool also includes a headstock base having the headstock disposed thereon. The headstock base is structured and arranged so as to be movable between a workpiece machining position where the workpiece can be machined at a position farther from the operator and a workpiece loading and unloading position where the workpiece can be loaded and unloaded at a position closer to the operator.

According to a second aspect of the invention, one of the carriages is disposed on a left side of the fixed bed and the other of the carriages is disposed on a right side of the fixed bed and the headstock can be disposable at a central location between the carriages to allow easy workpiece replacement.

According to a third aspect of the invention, a chip collecting opening can be provided in the fixed bed between the carriages and the headstock when the headstock is positioned in the workpiece machining position.

According to a fourth aspect of the invention, the fixed bed includes a tunnel formed therein. The tunnel communicates with the chip collecting opening and extends rearwardly away from the operator. In this way, the chips that have fallen into the chip collecting opening can be collected through the tunnel. Thus, this machine tool allows easy workpiece loading and unloading and improves operational efficiency of the machine tool.

With the machine tool according to the present invention, since the headstock is fixed to the headstock base and since the headstock base is set so as to be movable between a workpiece machining position on the rear side farther from the operator and the workpiece loading and unloading position is closer to the operator, loading and unloading of the workpiece can be performed at a location that is in close proximity to the operator on the front side of the fixed bed. Thus, operational efficiency and convenience can be improved.

With this machine tool, since the chip collecting space is formed at a location that is between the left and right carriages of the fixed bed as well as the headstock, the chips generated by the machining processes fall into the fixed bed. Also, these chips to do not present an obstacle to loading and unloading the workpiece. Thus, this is another reason that operational efficiency and convenience can be improved.

With the machine tool according to the fourth aspect of the invention, since the fixed bed has a tunnel formed that communicates with the chip collecting space and extends rearwardly, the chips that have fallen into the chip collecting space can be removed through the tunnel from the rear side of the machine tool opposite from the operator. Therefore, both the loading and unloading of the workpiece as well as the chip collecting work can be easily performed using the present invention.

DETAILED DESCRIPTION OF THE PREFERRED EMBODIMENTS

Hereinbelow, the embodiments of the present invention are described with reference to the accompanying drawings.

Figure 1:
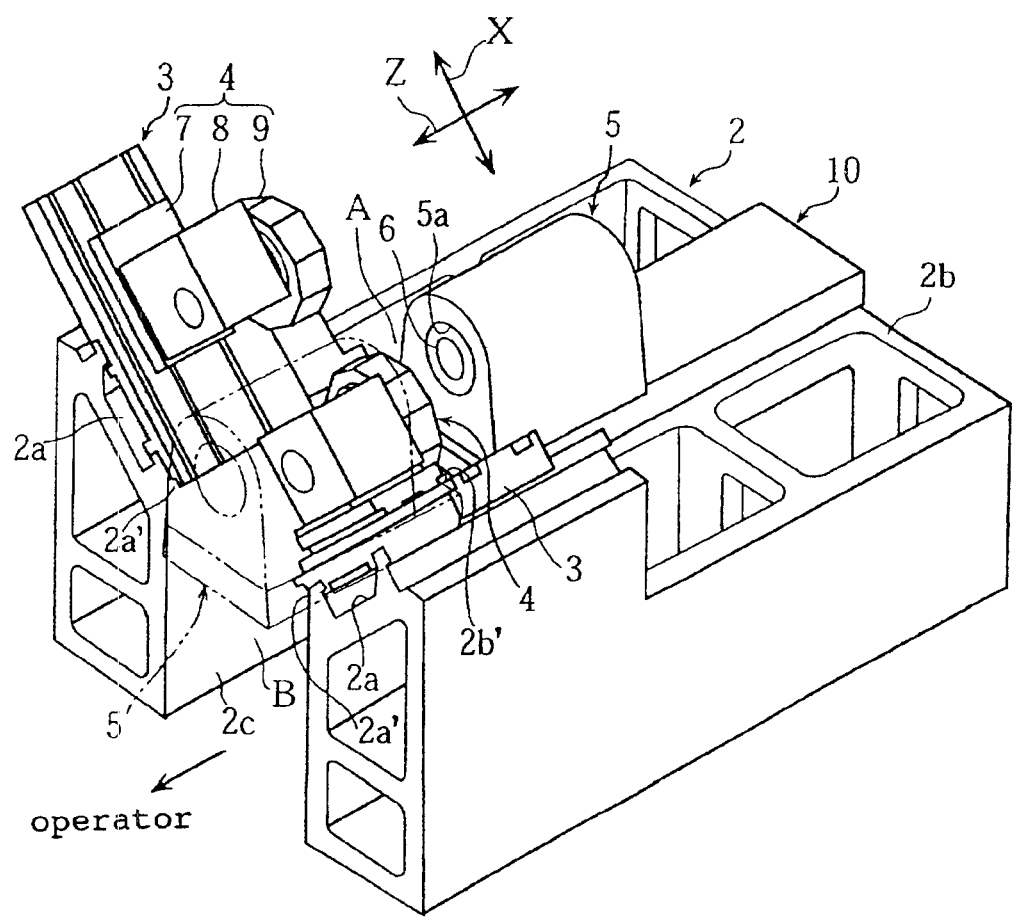
FIG. 1 is a front perspective view of an NC lathe according to a preferred embodiment of the present invention.
Figure 2:
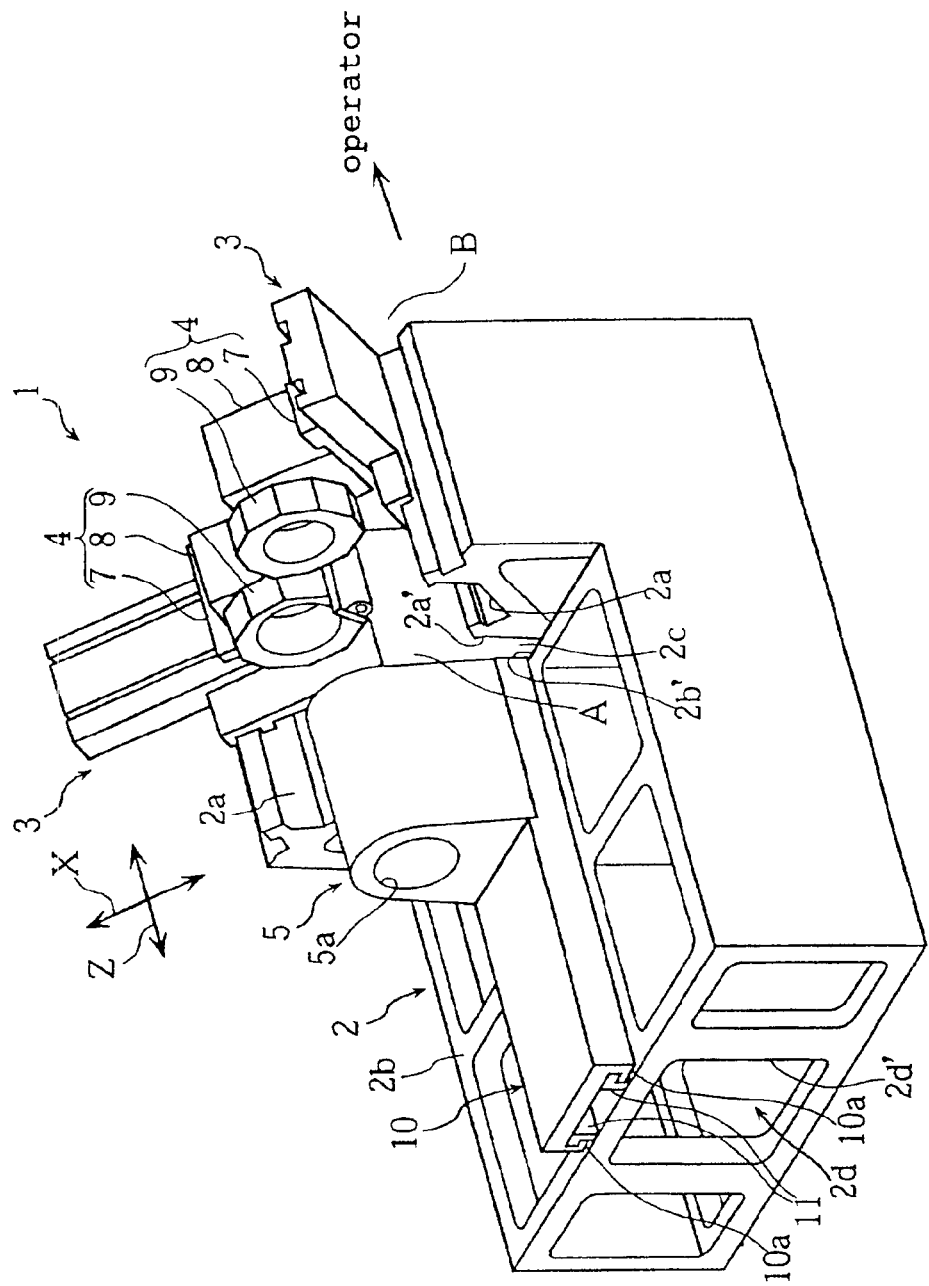
FIG. 2 is a reverse perspective view of the NC lathe shown in FIG. 1.

FIGS. 1 and 2 are views of a machine tool (such as a NC lathe) in accordance with one embodiment of the invention. FIG. 1 is a perspective view of the NC lathe as viewed from an oblique front angle. FIG. 2 is a perspective view of the NC lathe as viewed from an oblique rear angle.

The terms, front and rear, left and right are referred to in this embodiment as they are viewed from the operator side. That is, the front side means the side closer to the operator and the rear side means the opposite side that is farther from the operator. Also, the left side means the left side of the operator and the right side means the right side of the operator.

Referring to the FIGS. 1 and 2, an NC lathe 1 is shown that can be used for machining objects such as an aluminum wheel. In this machine tool, as viewed from the operator, a pair of left and right carriages 3 are provided on the left and right sides of a front end portion of a fixed bed 2 (closer to the operator) so they are movable back and forth in a Z-axis direction. The tool posts 4 are mounted on the individual carriages 3, respectively, so as to be movable back and forth in an X-axis direction (oblique left and right directions). A headstock 5 is disposed farther from the operator on the fixed bed 2 and between the left and right carriages 3 so that the longitudinal axis of the headstock 5 is directed along the Z-axis direction.

The headstock 5 has a spindle mounting hole 5a extending along the longitudinal axis of the headstock. A spindle 6 is rotatably inserted into the spindle mounting hole 5a via a plurality of bearings (not shown). A chuck (not shown) for gripping the workpiece can then be mounted on a front end portion of the spindle 6.

Each of the tool posts 4 is generally structured so that a tool post main body 8 is fixed to a tool post base 7 that is slidably supported on the carriage 3. A turret head 9 with a plurality of tools (not shown) mounted thereon is provided on the rear face of the tool post main body 8 so as to be rotationally indexable. The tool post base 7 is reciprocatingly driven in the X-axis direction by a drive mechanism made up of a servomotor, a ball screw and the like (which are not shown).

The fixed bed 2 can include a generally rectanglarly shaped portion and can be formed by a casting process. The fixed bed can also include left and right slanted portions 2a that present a V-shape when viewed from the front and they are integrally formed at the front of the fixed bed 2. A flat portion 2b is contiguous with the slanted portions 2a and has a stepped down configuration that is formed at the rear portion of the fixed bed 2.

The carriages 3 are slidably supported by the left and right slanted portions 2a. Each carriage 3 is reciprocatingly driven in the Z-axis direction by a drive mechanism made up of a servomotor, a ball screw and the like (which are not shown).

A headstock base 10 is provided on top of the flat portion 2b of the fixed bed 2. This headstock base 10 has a generally rectangular plate form extending over the entire length of the flat portion 2b. The headstock 5 is mounted and fixed at a front end portion of the headstock base 10. Also, a pair of rails 11 extend parallel to the Z-axis direction and are fixedly set on the flat portion 2b. The left and right guide portions 10a formed on the bottom face of the headstock base 10 slidably engage with the rails 11.

The headstock base 10 is reciprocatingly driven by a drive mechanism made up of a servomotor, a ball screw and the like or a cylinder mechanism (which are not shown). The headstock base 10 is driven between a workpiece machining position A where the workpiece is machined so that the headstock 5 is disposed rearwardly of the carriages 3 and a workpiece loading and unloading position B where the machined workpiece is replaced with the next workpiece on an operator side end portion of the fixed bed 2.

Further, a clamp mechanism implemented by a hydraulic cylinder (not shown) is provided between the headstock base 10 and the fixed bed 2. During the machining process, the headstock base 10 is fixedly positioned at the workpiece machining position A by the clamp mechanism.

A recessed portion 2c of the fixed bed 2 has a recessed form as seen in a plan view. The recessed portion 2c can be defined by lower end portions 2a' of the left and right slanted portions 2a and a front end portion 2b' of the flat portion 2b of the fixed bed 2. This recessed portion 2c provides a chip collecting space between by the left and right carriages 3 and the headstock 5 when the headstock 5 is positioned in the workpiece machining position A.

Also, a tunnel portion 2d communicates with the recessed portion 2c and extends rearwardly within the flat portion 2b of the fixed bed 2. A rear end opening 2d' of the tunnel portion 2d is provided in the rear end face of the flat portion 2b.

In the NC lathe 1 of this embodiment, the carriages 3 and the tool posts 4 are moved in the Z-axis and X-axis directions, respectively, relative to each other, so that the workpiece loaded on the spindle 6 is subjected to a specified cutting process. In this case, the two tool posts 4 can either simultaneously perform the machining of the workpiece or alternately perform the machining operation one by one.

When the machining of the workpiece is completed, the carriages 3 and the tool posts 4 move to a predetermined standby position where they stay in a standby state, while the headstock base 10 moves forwardly so that the headstock 5 is moved to the workpiece loading and unloading position B (see two-dot chain line in FIG. 1). At this workpiece loading and unloading position B, the machined workpiece is unloaded, and the next workpiece to be machined is loaded.

The chips generated during the machining of the workpiece fall into the cut-out recessed portion 2c and are collected through the rear end opening 2d' of the tunnel portion 2d.

As described above, the headstock 5 is fixed to the headstock base 10, and the headstock base 10 is moved between the workpiece machining position A, where the workpiece is machined side between the left and right carriages 3, and the workpiece loading and unloading position B, where the workpiece can be replaced on the side of the operator. Therefore, the workpiece loading and unloading work can be performed in close proximity to the operator so that operational efficiency and convenience can be improved.

In this embodiment, since the recessed portion 2c forming the chip collecting space is provided by a cutout at the front portion of the fixed bed 2, the chips generated through the machining processes fall into the recessed portion 2c of the fixed bed 2. Therefore, they do not present an obstacle to loading and unloading the workpiece. Thus, this also improves operational efficiency and convenience.

Further, since the tunnel portion 2d extends rearwardly within the flat portion 2b of the fixed bed 2 and is contiguous with the recessed portion 2c, the chips that have fallen from the rear end opening 2d' of the tunnel portion 2d into the recessed portion 2c can be collected. This structure allows both the workpiece loading and unloading work as well as the chip collection work to be easily achieved.

In addition, the workpiece loading and unloading processes as well as the chip collection work are not necessarily limited to the case where these jobs are done by the operator. The workpiece loading and unloading processes may be performed automatically by robot. Also, a chip conveyor can be provided that is disposed between the recessed portion 2c and end of the tunnel portion 2d so that the chips may be automatically and continuously removed by the chip conveyor.

Furthermore, although the above description has described the case where a pair of left and right carriages are provided on the fixed bed, the present invention is of course applicable also to cases where only one carriage is provided.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2000-134431 filed May. 8, 2000 is hereby incorporated by reference.

What is claimed is:

1. A machine tool comprising:
   a fixed bed, said fixed bed having a longitudinal axis, said fixed bed also including a first side and a second side disposed apart from each other and being intersected by the longitudinal axis;
   at least one tool post mounted on a first side of said fixed bed, wherein said at least one tool post being mounted on at least one carriage;
   a headstock provided on said fixed bed, wherein a workpiece disposed in said headstock is subjected to a cutting process by moving at least one of said at least one carriage and said at least one tool post relative to the workpiece;
   a headstock base having said headstock disposed thereon, the headstock and the headstock base are attached to each other and move together between a workpiece machining position where the workpiece can be machined at the second side of said fixed bed and a workpiece loading and unloading position where the workpiece can be loaded and unloaded adjacent the first side of said fixed bed; and
   a chip collecting opening in said fixed bed adjacent to said at least one carriage and said headstock when said headstock is positioned in the workpiece machining position and being open when said headstock is positioned in the workpiece machining position and being closed when said headstock is positioned in the workpiece loading and unloading position.

2. The machine tool according to claim 1, wherein said fixed bed further comprises a tunnel formed therein, the tunnel communicating with said chip collecting opening and extending rearwardly away from the first side of said fixed bed, whereby chips that have fallen into said chip collecting opening can be collected through the tunnel.

3. A machine tool comprising:
   a fixed bed, said fixed bed having a longitudinal axis, said fixed bed also including a first side and a second side disposed apart from each other and being intersected by the longitudinal axis;
   at least one tool post mounted on a first side of said fixed bed, wherein said at least one tool post being mounted on at least one carriage;
   a headstock provided on said fixed bed, wherein a workpiece disposed in said headstock is subjected to a cutting process by moving at least one of said at least one carriage and said at least one tool post relative to the workpiece; and
   a headstock base having said headstock disposed thereon, the headstock and the headstock base are attached to each other and move together between a workpiece machining position where the workpiece can be machined at the second side of said fixed bed and a workpiece loading and unloading position where the workpiece can be loaded and unloaded adjacent the first side of said fixed bed;
   wherein said at least one carriage comprises two carriages, one of said carriages being disposed on a left side of the first side of said fixed bed and the other of said carriages being disposed on a right side of the first side of said fixed bed, said headstock being disposable at a central location between said carriages; and
   a chip collecting opening in said fixed bed between said carriages and said headstock when said headstock is positioned in the workpiece machining position and being open when said headstock is positioned in the workpiece machining position and being closed when said headstock is positioned in the workpiece loading and unloading position.

4. The machine tool according to claim 3, wherein said fixed bed further comprises a tunnel formed therein, the tunnel communicating with said chip collecting opening and extending rearwardly away from the first side of said fixed bed, whereby chips that have fallen into said chip collecting opening can be collected through the tunnel.

5. A machine tool comprising:
   a fixed bed, said fixed bed having a longitudinal axis, said fixed bed also including a first side and a second side disposed apart from each other and being intersected by the longitudinal axis;
   a pair of tool posts mounted on a first side of said fixed bed, wherein each of said tool posts being mounted on a carriage;
   a headstock provided on said fixed bed, wherein a workpiece disposed in said headstock is subjected to a cutting process by moving at least one of said carriages and said tool posts relative to the workpiece; and
   a headstock base having said headatock disposed thereon, the headstock and the headstock base are attached to each other and move together between a workpiece machining position where the workpiece can be machined at the second side of said fixed bed and a workpiece loading and unloading position where the workpiece can be loaded and unloaded adjacent the first side of said fixed bed;
   wherein one of said carriages is disposed on a left side of the first side of said fixed bed and the other of said carriages is disposed on a right side of the first side of said fixed bed, said headstock being disposable at a central location between said carriages; and
   a chip collecting opening in said fixed bed between said carriages and said headatock when said headstock is positioned in the workpiece machining position and being open when said headstock is positioned in the workpiece machining position and being closed when said headstock is positioned in the workpiece loading and unloading position.

6. The machine tool according to claim 5, wherein said fixed bed further comprises a tunnel formed therein, the tunnel communicating with said chip collecting opening and extending rearwardly away from the first side of said fixed bed, whereby chips that have fallen into said chip collecting opening can be collected through the tunnel.

7. A machine tool comprising:
   a fixed bed, said fixed bed having a longitudinal axis, said fixed bed also including a first side and a second side disposed apart from each other and being intersected by the longitudinal axis;
   a pair of tool posts mounted on the first side of said fixed bed, wherein each of said tool posts being mounted on a respective carriage;
   a headstock provided on said fixed bed, wherein a workpiece disposed in said headstock is subjected to a cutting process by moving at least one of said carriages and said tool posts relative to the workpiece;
   a headstock base having said headstock disposed thereon, the headstock and the headstock base are attached to each other and move together between a workpiece machining position where the workpiece can be machined at the second side of said fixed bed and a workpiece loading and unloading position where the workpiece can be loaded and unloaded adjacent the first side of said fixed bed;

a chip collecting opening being disposed in said fixed bed between said respective carriages and said headstock and being open when said headstock is positioned in the workpiece machining position and being closed when said headstock is positioned in the workpiece loading and unloading position; and said fixed bed includes a tunnel formed therein, the tunnel communicating with said chip collecting opening and extends rearwardly away from the first side of said fixed bed, whereby chips that have fallen into said chip collecting opening can be collected through the tunnel.

8. A machine tool comprising:

a fixed bed, said fixed bed having a longitudinal axis, said fixed bed also including a first side and a second side disposed apart from each other and being intersected by the longitudinal axis;

a pair of tool posts mounted on the first side of said fixed bed, wherein each of said tool posts being mounted on a respective carriage;

a headstock provided on a headstock base, said headstock base being disposed on said fixed bed, whereby a workpiece disposed in said headstock can be subjected to a cutting process by moving at least one of said respective carriages and said tool posts relative to the workpiece;

said headstock being movable between a workpiece machining position where the workpiece can be machined at the second side of said fixed bed and a workpiece loading and unloading position where the workpiece can be loaded and unloaded adjacent the first side of said fixed bed;

a chip collecting opening being disposed in said fixed bed between said respective carriages and said headstock and said headstock being positionable over said chip collecting opening so that said chip collecting opening is open when said headstock is positioned in the workpiece machining position and is closed when said headstock is positioned in the workpiece loading and unloading position; and said fixed bed includes a tunnel formed therein, the tunnel communicating with said chip collecting opening and extending rearwardly away from the first side of said fixed bed, whereby chips that have fallen into said chip collecting opening can be collected through the tunnel.

* * * * *